(12) United States Patent
Heuer et al.

(10) Patent No.: US 8,898,559 B2
(45) Date of Patent: Nov. 25, 2014

(54) METHOD FOR ENCODING AN XML-BASED DOCUMENT

(75) Inventors: Jörg Heuer, München (DE); Andreas Hutter, München (DE)

(73) Assignee: Siemens Aktiengesellschaft, Munich (DE)

( * ) Notice: Subject to any disclaimer, the term of this patent is extended or adjusted under 35 U.S.C. 154(b) by 570 days.

(21) Appl. No.: 10/537,501

(22) PCT Filed: Dec. 1, 2003

(86) PCT No.: PCT/EP03/13511
§ 371 (c)(1),
(2), (4) Date: Jun. 3, 2005

(87) PCT Pub. No.: WO2004/051502
PCT Pub. Date: Jun. 17, 2004

(65) Prior Publication Data
US 2006/0013322 A1    Jan. 19, 2006

(30) Foreign Application Priority Data

Dec. 3, 2002 (DE) .................................... 10256455
Aug. 29, 2003 (DE) .................................... 10339971

(51) Int. Cl.
G06F 17/22 (2006.01)
H04N 21/235 (2011.01)
H04N 21/435 (2011.01)
G06F 17/27 (2006.01)

(52) U.S. Cl.
CPC ......... *H04N 21/2353* (2013.01); *H04N 21/235* (2013.01); *H04N 21/435* (2013.01); *G06F 17/2247* (2013.01)

USPC ........... 715/234; 715/237; 715/242; 707/736; 707/741

(58) Field of Classification Search
CPC ..................................................... G06F 17/2247
USPC .................. 715/513, 234, 237, 242; 719/330; 370/394
See application file for complete search history.

(56) References Cited

U.S. PATENT DOCUMENTS

| | | | |
|---|---|---|---|
| 7,089,567 B2 * | 8/2006 | Girardot et al. ............... | 719/330 |
| 2002/0143521 A1 * | 10/2002 | Call ................................. | 704/1 |
| 2002/0159519 A1 * | 10/2002 | Tabatabai et al. ......... | 375/240.01 |
| 2004/0028049 A1 * | 2/2004 | Wan .............................. | 370/394 |
| 2004/0139393 A1 * | 7/2004 | Heuer et al. .................. | 715/513 |

OTHER PUBLICATIONS

Girardot et al, "Millau: an encoding format for efficient representation and exchange of XML over the Web", published: Aug. 24, 2000, pp. 1-22.*
Jane Hunter, "An Overview of the MPEG-7 Description Definition Language (DDL)", published: Jun. 2001, pp. 765-772.*

(Continued)

*Primary Examiner* — Stephen Hong
*Assistant Examiner* — Wilson Tsui
(74) *Attorney, Agent, or Firm* — King & Spalding L.L.P.

(57) ABSTRACT

The disclosure relates to a method for encoding an XML-based document (DOC), where the contents of the document correspond to an XML-schema voice definition. According to one exemplary method, an encoded binary representation (BDOC) of the document is produced by associating the contents of the document with binary structural codes (SBC) using encoding tables (CT), textual contents of a "complex type" data type being associated with the "mixed" content model structural codes (SBC).

17 Claims, 4 Drawing Sheets

| Position Code | Addressed node |
|---|---|
| - | Parent node |
| 00, 01, 10 | textual content |
| - | firstElement |
| - | secondElement |

(56) References Cited

OTHER PUBLICATIONS

Bourret et al, "A Generic Load/Extract Utility for Data Transfer Between XML Documents and Relational Databases", published: 2000, publisher: IEEE, pp. 1-10.*

Information Technology—Multimedia Content Description Interface—Part 1 Systems Technologies De L'Information—Interface De Description Du Contenu Multimedia—Parts 1: "Systems" International Standard ISO-IEC XX, XX vol. 15938-1, Jul. 1, 2002, pp. I-V, 1, XP009032887.

Neven F.; "Automata, Logic and XML" Proceedings of the 16th International Workshop and 11th Annual Conference of the EACSL o Computer Science Logic, Sep. 22, 2002, pp. 2-25, XP002306573, ISBN 3-540-44240-5.

Cowan J: "Re Attributes v Elements", Internet Citation May 17, 2001, XP002306574.

Bourret R: "Mapping DTDs to Databases", Internet Citation, May 9, 2001, XP002306575.

Niedermeier U. et al., "An MPEG-7 Tool for Compression and Streaming of XML Data", Proceedings IEEE International Conference on Multimedia and EXPO, vol. 1, Aug. 26, 2002, pp. 521-524 XP010604420.

XML Schema Part 0: Primer, W3C Recommendation May 2, 2001.

XML Schema Part 1: Structures W3C Recommendation May 2, 2001.

"An Implementation of Extended XML Processors and Its Consideration", in Technical Report of IEIC, written by Takeo Kunishima et al., published by the Institute of Electronic, Information and Communication Engineers, Jun. 5, 2001, vol. 101, No. 110, pp. 105-112.

Don Box et al. *"Essential XML—Beyond Markup,"* Addison-Wesley, (10 pages), Sep. 2000.

Li Bing et al. *"An Architecture for Multidatabase Systems Based on COBRA and XML,"* College of Computer Science and Technology, Huazhong University of Science & Technology, (6 pages), Sep. 2001.

Oers, Marius, "Evil Elves", Virus Bulletin, pp. 6-7, Jul. 2001.

\* cited by examiner

FIG 2  Prior Art

```
<?xml version="1.0" encoding="UTF-8"?>
<xs:schema xmlns:xs="http://www.w3.org/2001/XMLSchema" elementForm-
   Default="qualified" attributeFormDefault="unqualified">
<xs:element name="Example">
<xs:complexType>
<xs:sequence>
<xs:element name="MixedElement" type="MixedType"/>
</xs:sequence>
</xs:complexType>
</xs:element>

<xs:complexType name="MixedType" mixed="true">
<xs:sequence>
<xs:element name="firstElement" type="xs:string"/>
<xs:element name="secondElement" type="xs:string"/>
</xs:sequence>
</xs:complexType>
</xs:schema>
```

FIG 3  Prior Art

```
<?xml version="1.0" encoding="UTF-8"?>
<Example xmlns:xsi="http://www.w3.org/2001/XMLSchema-instance"
   xsi:noNamespaceSchemaLocation="C:\data\Awaji\BiM\mixed\mixed.xsd">
<MixedElement>
 1st textual content
   <firstElement>Content of firstElement</firstElement>
 2nd textual content
   <secondElement>Content of secondElement</secondElement>
 3rd textual content
</MixedElement>
</Example>
```

FIG 5

| Structure code | Addressed node |
|---|---|
| 00 | Parent node |
| 01 | textual content |
| 10 | firstElement |
| 11 | secondElement |

FIG 6

| Position Code | Addressed node |
|---|---|
| - | Parent node |
| 00, 01, 10 | textual content |
| - | firstElement |
| - | secondElement |

METHOD FOR ENCODING AN XML-BASED DOCUMENT

FIELD OF TECHNOLOGY

The present disclosure relates to a method for encoding an XML-based document (DOC) which includes contents corresponding to an XML schema language definition. It further relates to a corresponding decoding method as well as to corresponding encoding and decoding devices.

BACKGROUND

XML (=Extensible Markup Language) is a language which enables a structured description of the contents of a document to be produced by means of XML schema language definitions. A more detailed description of the XML schema and also of the structures, data types and content models used therein can be found in [1] http://www.w3.org/TR/2001/REC-xmlschema-0-20010502/; [2] http://www.w3.org/TR/2001/REC-xmlschema-1-20010502/ and [3] http://www.w3.org/TR/2001/REC-xmlschema-2-20010502/.

Methods for encoding XML-based documents in which the document is converted into a coded binary representation are known from the prior art. Methods for encoding and decoding XML-based documents are described for example in document [4] ISO/IEC FDIS 15938-1 "Information Technology—Multimedia Content Description Interface—Part 1: Systems", Geneva 2002 which was produced in the course of the development of an MPEG-7 coding standard.

Current methods for generating a binary representation of XML-based documents have disadvantages when it comes to the encoding of "complex type" data types with the "mixed" content model, because in addition to elements, the data types can include textual contents which can, however, only be reconstructed by the decoding of the entire data stream. A more detailed description of the "complex type" data type and of the "mixed" content model can be found in document [1] http://www.w3.org/TR/2001/REC-xmlschema-0-20010502/, discussed above.

Accordingly, there is a need for a system and method for encoding XML-based documents which enables easier access to coded textual contents of the "complex type" data type with the "mixed" content model.

BRIEF SUMMARY

Under the exemplary encoding methods disclosed herein, a coded binary representation of an XML-based document is created in that the contents of the document are assigned binary structure codes by way of coding tables, with structure codes being assigned to textual contents of a "complex type" data type with the "mixed" content model. The structure codes are the schema branch codes (SBC) defined in section 7.6.1 of [4] ISO/IEC FDIS 15938-1 "Information Technology—Multimedia Content Description Interface—Part 1: Systems", Geneva 2002, cited above. As a result of the assignment of structure codes to contents of the document as described in [4] ISO/IEC FDIS 15938-1 "Information Technology—Multimedia Content Description Interface—Part 1 Systems", Geneva 2002, the location of said contents in the structure of the XML documents can be signaled or addressed.

Under an exemplary embodiment, the textual content of a "complex type" data type with "mixed" content model is treated as an element declaration in the type definition during the code assignment. Accordingly, for the purposes of encoding, as well as the declared elements, a specified structure code is also assigned in addition to the textual content in a type definition when a mixed content model is defined for the type. Accordingly, textual contents in the coded data stream are addressed, with the result that said contents can be accessed without the need to decode the entire data stream.

Structure codes are preferably assigned to the textual contents of a "complex type" data type with "mixed" content model via OperandTBC coding tables. Said coding tables specify the codes of what are referred to as the OperandTBCs, i.e. the so-called TBCs (TBC=Tree Branch Code) of the so-called operand nodes. A detailed description and definitions of the OperandTBCs and operand nodes can be found in sections 7.6.1 and 7.6.5.2 of [4] ISO/IEC FDIS 15938-1 "Information Technology—Multimedia Content Description Interface—Part 1: Systems", Geneva 2002.

In another embodiment, "position codes" are also assigned to the textual contents of a "complex type" data type with the "mixed" content model. These codes are the position codes described in more detail in section 7.6.5.5 of [4] ISO/IEC FDIS 15938-1 "Information Technology—Multimedia Content Description Interface—Part 1: Systems", Geneva 2002. Since a plurality of textual contents may be contained in a "complex type" data type with the "mixed" content model, the position codes serve to transmit the information indicating at which position the textual contents are located within the data type.

In yet another embodiment, "single element position codes" and/or "multiple element position codes" are used for the assignment of the "position codes". These position codes are described in more detail in [4] ISO/IEC FDIS 15938-1 "Information Technology—Multimedia Content Description Interface—Part 1: Systems", Geneva 2002, section 7.6.5.5. Single element position codes are used in particular when no "model group" can occur more often than once in the type definition of the "complex type" in the XML schema definition. A definition of the "model group" can be found in [2] http://www.w3.org/TR/2001/REC-xmlschema-1-20010502. In this case the single element position code determines the position of a content in relation to a particular particle in an instantiation of a data type. A definition of particles can also be found in document [2]. The single element position code is encoded on the assumption that the textual content is declared a maximum of MPA+1 times, where MPA denotes the number of all particle instantiations possible in this data type. A multiple element position code is used when "model groups" can occur more often than once in the definition of the "complex type" in the XML schema definition. The multiple element position code is encoded on the assumption that a total of 2*MPA+1 positions can be addressed, with this code reflecting the position of the content in relation to all particles in an instantiation of a data type.

In a further preferred embodiment, the position codes are encoded using codes of variable length, in particular using the code vluimsbf5, which is described in [4] ISO/IEC FDIS 15938-1 "Information Technology—Multimedia Content Description Interface—Part 1: Systems", Geneva 2002, section 4.3.

In addition to the above described encoding method the disclosure further includes a decoding method by means of which a binary representation of an XML-based document encoded according to the above described encoding method is decoded. Under the decoding method, binary representations of textual contents of a "complex type" data type with the "mixed" content model which were assigned structure codes (SBC) during the encoding are converted into the textual contents of the XML-based document which were assigned to the structure codes (SBC).

Analogously to the encoding method, in the exemplary embodiment the assignment is effected by means of structure codes (SBC) by way of OperandTBC coding tables.

Binary representations of textual contents of a "complex type" data type with the "mixed" content model, addressed by means of "position codes", are also converted into textual contents at an assigned position. In this case the "position codes" can in turn comprise "single element position codes" and/or "multiple element position codes". These position codes are the same position codes as defined in relation to the encoding method. Analogously to the encoding method, the "position codes" can also be encoded using codes of variable length, said codes being decoded during the conversion of the position codes into textual contents. The position codes are preferably encoded using the code vluimsbf5.

A device for encoding XML-based documents is also disclosed, wherein an encoding method disclosed herein can be performed, the device comprising a storage means in which at least one assignment of a textual content of a "complex type" data type with the "mixed" content model to a structure code is stored. In an analogous manner, the disclosure includes a device for decoding a coded binary representation of an XML-based document, the device being configured in such a way that the decoding method disclosed herein can be performed. The device includes a storage means in which at least one assignment of a structure code to a textual content of a "complex type" data type with the "mixed" content model is stored.

The disclosure further includes a device for encoding and decoding an XML-based document, using the encoding device disclosed herein and the decoding device disclosed herein.

BRIEF DESCRIPTION OF THE DRAWINGS

Exemplary embodiments of the invention are explained below with reference to the attached drawings, in which:

FIG. 2 shows an XML schema definition in which, among other things, a "complex type" data type with "mixed" content model is defined;

FIG. 3 shows an XML document in which an element "MixedElement" declared in the XML schema definition of FIG. 2 is instantiated;

FIG. 5 shows a table serving to explain the assignment of structure codes for "complex type" data types with "mixed" content model; and FIG. 6 shows a table serving to explain the assignment of "position codes" for "complex type" data types with "mixed" content model.

DETAILED DESCRIPTION

Figure 1:
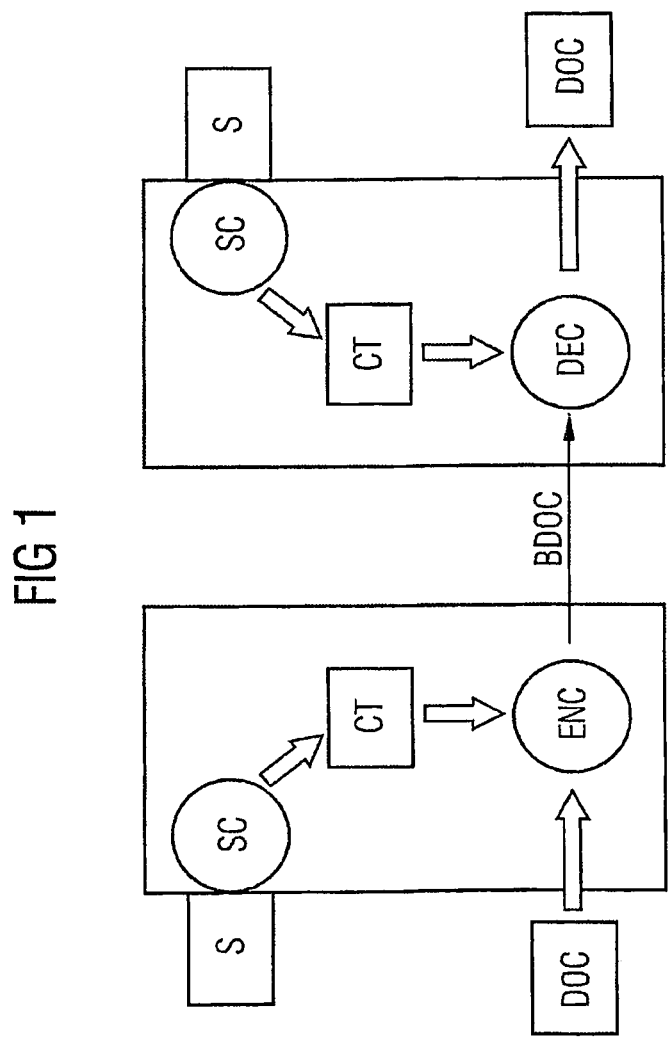
FIG. 1 shows an exemplary schematic diagram of an encoding and decoding system according to one embodiment, having an encoder and a decoder.

FIG. 1 shows by way of example an encoding and decoding system comprising an encoder ENC and a decoder DEC wherein XML documents DOC are encoded and decoded respectively. Both the encoder and the decoder have an XML schema S in which the elements and types of the XML document which are used for communication are declared and defined. Code tables CT are generated in the encoder and decoder from the schema S via corresponding schema compilations SC. When the XML document DOC is encoded, binary codes are assigned to the contents of the XML document via the code tables. Accordingly, a binary representation BDOC of the document DOC is generated, which binary representation can be decoded again in the decoder with the aid of the code table CT.

The method according to the invention is characterized in that textual contents of a "complex type" data type with the "mixed" content model are assigned binary structure codes. This enables the textual data to be filtered out from the binary representation BDOC without the need to decode the entire binary representation BDOC.

FIG. 2 shows by way of example a schema S, an element with the name "Example" being declared in this schema in lines 4 to 10, said element in turn containing an element with the name "MixedElement" of the type "MixedType". The type "MixedType" is defined in lines 12 to 17, and is a "complex type" data type with the content model "mixed", as can be derived in particular from line 12. The type "MixedType" contains two elements with the name "firstElement" and "secondElement", both of which are of the "string" type.

FIG. 3 shows an instantiation of the element "MixedElement" in an XML document. Since the "mixed" content model can include textual contents in the form of strings, textual contents can occur before, after or between the first and second elements "firstElement" and "secondElement". A total of three textual contents occur in the example shown in FIG. 3.

Figure 4:
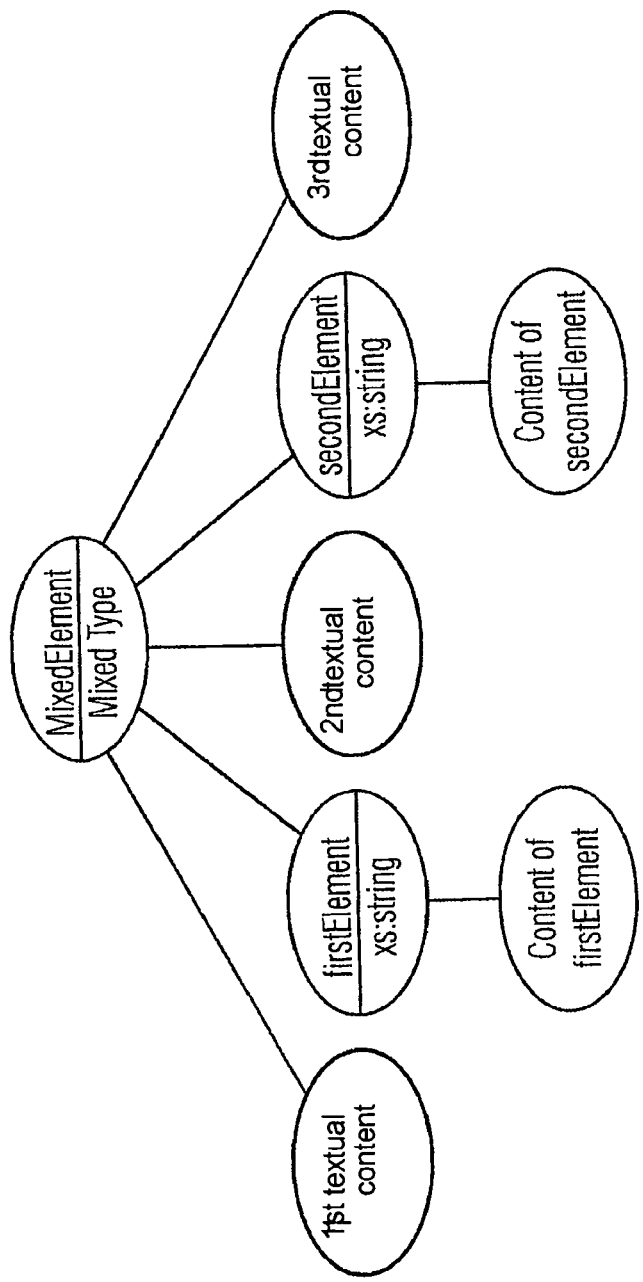
FIG. 4 shows a graphical representation of the structure of the element "MixedElement" instantiated in the XML document of FIG. 3.

The structure of the element "MixedElement" which is instantiated in FIG. 3 is shown again in FIG. 4, this time in graphical form as a tree structure. From the topmost MixedElement/MixedType node there branch off at a first hierarchy level five further nodes which contain both the textual contents and also the elements "firstElement" or, as the case may be, "secondElement". At a second hierarchy level the elements "firstElement" and "secondElement" further contain the corresponding contents "Content of firstElement" and "Content of secondElement" respectively.

Documents based on the XML language can be represented by what is referred to as a tree structure, the contents of the XML document forming nodes in the tree structure and what are referred to as "context paths" leading to the nodes. Binary structure codes are assigned to the nodes of the tree structure during the encoding.

According to the prior art, for the element node "MixedElement" shown in FIG. 4, a structure code is assigned in each case to the parent node and also to the elements "firstElement" and "secondElement". In this case the parent node is the node which is connected to the node of the element "MixedElement" in the next-higher hierarchy level. In contrast under the present disclosure, a structure code is not only assigned to the parent node and to the elements "firstElement" and "secondElement", but is also assigned to the textual content. This is illustrated in FIG. 5, where the code 00 is assigned to the parent node, the code 01 to the textual content and the codes 10 and 11 to the "firstElement" and the "secondElement" respectively.

Furthermore, under another exemplary embodiment, "position codes" may be assigned to the individual textual contents, as shown in FIG. 6. Since textual contents can occur at a total of three positions, three "position codes" are required for this purpose, the codes 00, 01 and 10 being used according to FIG. 6.

The above described description and drawings are only to be considered illustrative of exemplary embodiments, which achieve the features and advantages of the invention. Modifications and substitutions to specific process conditions and structures can be made without departing from the spirit and scope of the invention. Accordingly, the invention is not to be considered as being limited by the foregoing description and drawings, but is only limited by the scope of the appended claims.

LIST OF REFERENCES

[1] http://www.w3.org/TR/2001/REC-xmlschema-0-20010502/
[2] http://www.w3.org/TR/2001/REC-xmlschema-1-20010502/
[3] http://www.w3.org/TR/2001/REC-xmlschema-2-20010502/
[4] ISO/IEC FDIS 15938-1 "Information Technology—Multimedia Content Description Interface—Part 1: Systems", Geneva 2002

The invention claimed is:

1. A method for encoding an XML-based document having contents including a mixed element that is an instance of a complex data type with a mixed content model, the mixed element including one or more XML elements and separate textual content, according to an XML schema language definition, said method comprising the steps of:
generating a coded binary representation of the document by assigning binary structure position codes to the structured elements of the document defined by the XML schema language definition via code tables,
wherein the mixed element of the XML-based document comprises a parent node having a binary structure position code and in a first hierarchical plane below said parent node a plurality of element nodes having binary structure position codes, and
wherein the assignment of the binary structure positions codes includes treating the textual content of the mixed element of the XML-based document as a structured element in a node in the first hierarchical plane by encoding the textual content with a binary structure position code defined by an OperandTBC coding table, such that the encoded textual content is accessible from the encoded XML-based document by locating the binary structure position code corresponding with the textual content.

2. The method according to claim 1, wherein the textual contents of the mixed element of the XML-based document are further assigned position codes.

3. The method according to claim 2, wherein single element position codes and/or multiple element position codes are used in the assignment of the position codes.

4. The method according to claim 2, wherein the position codes are encoded using codes of variable length.

5. The method according to claim 4, wherein the position codes are encoded using a code vluimsbf5.

6. A method for decoding a coded binary representation of an XML-based document including a mixed element that is an instance of a complex data type with a mixed content model, the mixed element including one or more XML elements and separate textual content, comprising:
receiving a coded binary representation of the document by assigning binary structure position codes to the structured elements of the document defined by the XML schema language definition via code tables, wherein the mixed element of the XML-based document comprises a parent node having a binary structure position code and in a first hierarchical plane below said parent node a plurality of element nodes having binary structure position codes;
assigning a structure position code of an OperandTBC coding table to textual content of the mixed element of the XML-based document; and
treating the textual content of the mixed element of the XML-based document as a structured element node within the first hierarchical plane using the OperandTBC coding table structure position code assigned to textual content, such that the encoded textual content is accessible from the coded XML-based document by locating the structure position code corresponding with the textual content.

7. The method as claimed in claim 6 wherein binary representations of textual contents of a "complex type" data type with the "mixed" content model, addressed by means of "position codes", are further converted into textual contents at the assigned position.

8. The method as claimed in claim 7, wherein the "position codes" comprise "single element position codes" (SPC) and/or "multiple element position codes" (MPC).

9. The method as claimed in claim 7, wherein the "position codes" are encoded using codes of variable length.

10. The method as claimed in claim 9, wherein the "position codes" are encoded using a code vluimsbf5.

11. A device for encoding XML-based documents having contents including a mixed element that is an instance of a complex data type with a mixed content model, the mixed element including one or more XML elements and separate textual content, according to an XML schema language definition, comprising:
means for generating a coded binary representation of the document by assigning binary structure position codes to the structured elements of the document defined by the XML schema language definition via code tables, wherein the mixed element of the XML-based document comprises a parent node having a binary structure position code and in a first hierarchical plane below said parent node a plurality of element nodes having binary structure position codes;
means for assigning a structure position code of an OperandTBC coding table to textual content of the mixed element of the XML-based document; and
means for treating the textual content of the mixed element of the XML-based document as a structured element node within the first hierarchical plane using the OperandTBC coding table structure position code assigned to textual content, such that the encoded textual content is accessible from the encoded XML-based document by locating the structure position code corresponding with the textual content.

12. A device for decoding XML-based documents having contents including a mixed element that is an instance of a complex data type with a mixed content model, the mixed element including one or more XML elements and separate textual content, according to an XML schema language definition, comprising:
means for generating a coded binary representation of the document by assigning binary structure position codes to the structured elements of the document defined by the XML schema language definition via code tables, wherein the mixed element of the XML-based document comprises a parent node having a binary structure position code and in a first hierarchical plane below said parent node a plurality of element nodes having binary structure position codes;

means for assigning a structure position code of an OperandTBC coding table to textual content of the mixed element of the XML-based document; and means for treating the textual content of the mixed element of the XML-based document as a structured element node within the first hierarchical plane using the OperandTBC coding table structure position code assigned to textual content; and means for decoding the assigned structure position code of the OperandTBC coding table into the textual content of the mixed element of the XML-based document that was assigned to the structure position code.

13. A method for encoding an XML-based document having contents including a mixed element that is an instance of a complex data type with a mixed content model, the mixed element including one or more XML elements and separate textual content, according to an XML schema language definition, said method comprising the steps of:

generating a coded binary representation of the document using a tree structure by assigning binary structure position codes to structured elements defined by the XML schema language definition via code tables, wherein the mixed element is encoded as a parent node having a binary structure position code and in a first hierarchical plane below said parent node a plurality of nodes having binary structure position codes, wherein the assignment of the binary structure positions codes includes treating the textual content of the mixed element of the XML-based document as a structured element node in the first hierarchical plane by encoding the textual content with a binary structure position tree branch code defined by an OperandTBC coding table, such that the encoded textual content is accessible from the encoded XML-based document by locating the binary structure position code corresponding with the textual content, and wherein one or more other elements are assigned within said first hierarchical plane wherein the content of said other elements are assigned to a lower hierarchical plane.

14. The method according to claim 13, wherein the textual contents of the mixed element of the XML-based document are further assigned position codes.

15. The method according to claim 14, wherein single element position codes and/or multiple element position codes are used in the assignment of the position codes.

16. The method according to claim 14, wherein the position codes are encoded using codes of variable length.

17. The method according to claim 16, wherein the position codes are encoded using a code vluimsbf5.

* * * * *